United States Patent [19]

Janian

[11] Patent Number: 4,939,830
[45] Date of Patent: Jul. 10, 1990

[54] METHOD OF MAKING ELASTOMERIC EMBEDDED SPRING SEAL

[75] Inventor: Robert Janian, Encino, Calif.

[73] Assignee: Tetrafluor, Inc., El Segundo, Calif.

[21] Appl. No.: 319,346

[22] Filed: Mar. 6, 1989

[51] Int. Cl.$^5$ .............................................. B21F 35/00
[52] U.S. Cl. ...................................... 29/173; 264/273; 264/275
[58] Field of Search ......................... 29/173; 425/116; 264/273, 275, 318, 334

[56] References Cited

U.S. PATENT DOCUMENTS 4,261,192  4/1981  Janian et al. .......................... 29/173
4,508,356  4/1985  Janian ................................... 277/164

Primary Examiner—P. W. Echols
Attorney, Agent, or Firm—Cislo & Thomas

[57] ABSTRACT

A method of making a spring-energized elastomeric seal is disclosed in which the seal has a C-shape or a U-shape spring substantially surrounded by an elastomer. The method uses a male die section upon which the spring is loaded. A female die section is positioned around the male section. Elastomer is injected, cooled and the die sections pulled apart yielding the finished seal.

7 Claims, 1 Drawing Sheet

METHOD OF MAKING ELASTOMERIC EMBEDDED SPRING SEAL

BACKGROUND OF THE INVENTION

This invention is directed to a method for making a deformable sealing element comprising an elastomeric material in which a spring is at least partially embedded.

In my U.S. Pat. No. 4,508,356, I have described and claimed a spring seal comprising an elastomeric jacket having a modified, C-shaped, interior cross-section and a metallic spring strip which conforms to and is registrable within a cavity of the jacket. I have also described in that patent other spring seals which constituted prior art at that time. The benefits of such a seal are well described in the aforecited U.S. Patent. However, making the spring seal requires a special approach to embedding the spring within an elastomeric or plastic material. More specifically, and with reference to FIGS. and 2 an internal cavity within the chosen elastomeric material must be first prepared.

As shown in FIG. 1 the jacket which will hold the spring must have an internal cavity of a predetermined size and shape.

As shown in FIG. 1 the jacket may be formed by an initial and final rotating forming tool having cutting knives and which extend at selected radial distances from the center of rotation of the tool. An initial cutting tool cuts along an initially solid body of Teflon or elastomer. The final tool is moved along the length of the jacket cutting a shape corresponding to the internal C-shaped cavity to be formed in the jacket. As the cutting tool cuts along the jacket material, the cutting edges of the knives remove material to leave the shaped, but unstressed sidearms of the jacket.

A convenient and advantageous spring and seal design is based upon a relatively complicated shape which is most difficult to cut. A more detailed explanation of the complexities is found in my above-mentioned U.S. patent.

With this complicated geometry, the shape of the spring and jacket can be precisely defined and appropriate tooling can be fabricated for any recess into which a spring is to be seated.

The elastomeric embedded spring has previously heretofore been difficult and expensive to make. The method of the present invention has greatly simplified the making of elastomeric embedded springs. The method allows for greater ease in manufacturing, so that larger numbers of the seals can be produced in less time and at substantially less cost. Yet, the quality of the seals is still high.

The features identified above as being desirable in the manufacture of elastomeric spring seals are all provided by the present invention.

SUMMARY OF THE INVENTION

The present invention is embodied in an improved method for making elastomeric, embedded spring seals. The method lends itself to large scale manufacturing, yielding high quality seals with lower unit production costs. In addition the method eliminates the use of any cutting tools.

More particularly, the method incorporates several steps to mold an elastomer about a spring using a die. The first step is setting up the die, wherein the die comprises an independent male section and an independent female section. The spring is loaded around the male section of the die. The female section is then positioned around the male section of the die and the spring. The next step is injecting the elastomer into the die at a temperature which allows it to flow into the female section of the die. The elastomer flows around the spring while it is still held by the male section of the die. The elastomer is allowed to set for a predetermined time. Finally, the finished spring seal is obtained by separating the male and female sections of the die. The male section has a shape which allows the ends of the finished spring seal to flex. The ends of the spring seal formed flex allowing the sections of the die to be pulled away from the spring seal. As such the finished spring seal can be unloaded from the male section of the die.

The injection port for the injection of the heated elastomer may be located within the female section of the die.

The male section of the die can have a shaped lip which complements the spring to be embedded in the elastomer. Also, the female section of the die likewise may have a U-shape or C-shape which complements the corresponding male section of the die, leaving a cavity with space for the elastomer to flow around the spring, when the female section is positioned around the male section.

During the step of injecting the elastomer, the elastomer may be only allowed to partially surround the spring. More specifically, the female section of the die and the male section may have complementary geometries so as to prevent the elastomer from completely flowing around predetermined portions of the spring.

Other aspects and advantages of the present invention will become apparent from the following description of the preferred embodiment, taken in conjunction with the accompanying drawings, which illustrate, by the way of example, the principles of the invention.

Figure 1:
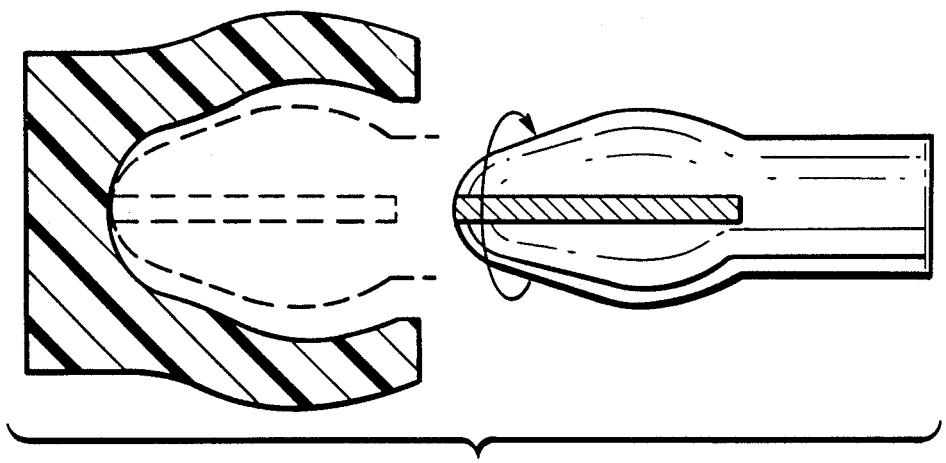
FIG. 1 illustrates tools used in an older process for forming a cavity in elastomer utilizing a cutting tool.

As shown in the drawings, the invention is embodied in a method of molding and forming a spring within an elastomer using a die having male and female sections.

Figure 2:
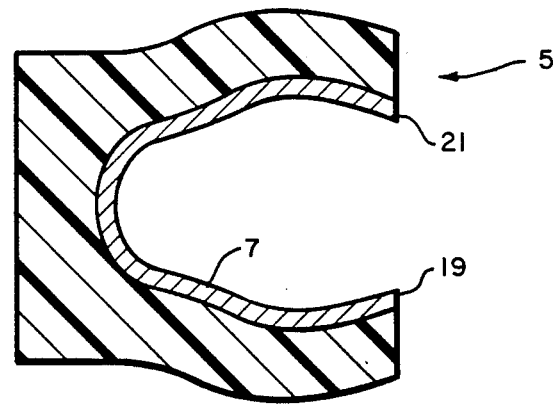
FIG. 2 is a cross-sectional view of an elastomeric embedded spring seal comprising an outer jacket containing a spring element of C-shaped configuration in a cavity within the jacket.

In accordance with the invention an elastomeric embedded spring seal as shown in FIG. 2 can be easily formed. For a more complete description of the spring seal U.S. Pat. No. 4,508,356 issued to Robert Janian on Apr. 2, 1985 is hereby incorporated by reference.

Figure 3:
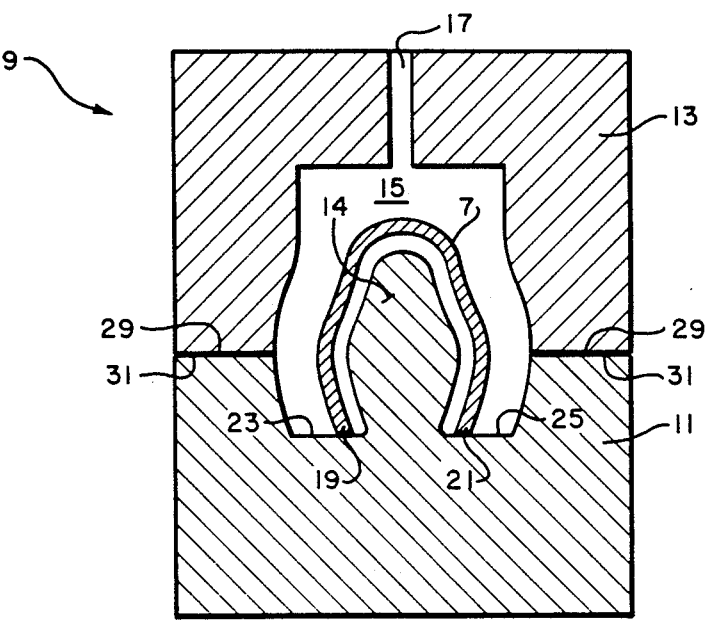
FIG. 3 shows a cross-sectional view of a female and a male section of a die with a spring element of the type shown in FIG. 2 within the die.

As shown in FIG. 3, a spring seal 5 can be formed by the process of locating a spring 7 within a die 9. The die is made up of a male section 11 and female section 13. The spring is actually loaded onto a protruding lip 14 portion of the male section. The female section is placed over and around the spring, abutting up against the male section and forming a molding cavity 15 therebetween. An injection port 17 is defined by the female section and allows the injection of elastomer sufficiently heated so that it can flow into both the female and male sections. The elastomer is allowed to flow around and surround the loaded spring.

The elastomer is allowed to cool and solidify. Next, the male and female sections 11 and 13 are pulled apart exposing the newly formed spring seal 5. The spring seal can be taken out of the sections and used.

When the spring 7 is loaded upon the male section 11, its ends 19 and 21 rest upon recesses 23 and 25 of the male section. A slight clamping force of the spring may pinch and hold the lip 14 of the male section in contact with the spring. The spring surrounds but does not rest upon the lip. This distinction may be critical in that when the elastomer is injected, the elastomer is free to flow between the lip of the male section and the spring positioned around the lip.

The lip 14 rises out between the recesses 23 and 25 in the male section of the die 9, thereby dividing the recesses. The two ends 19 and 21 of the spring 7 are positioned on opposite sides of the recesses and thereby straddle the lip. When the lip of the male section is loaded with the spring, the ends of the spring typically rest at the bottom of the recesses. The height of the lip or the length of spring is respectively sized so as not to come in contact with each other. Only the ends of the spring contact the male Section. This allows the free flow of elastomer between the spring and the male section.

The lip 14 may rise above a surrounding flat surface 29 of the male section which comes in contact with a complementary flat surface 31 of the female section 13 during the injection of the elastomer.

The female section 13 when placed adjacent to and abutted against the male section 11 forms the molding cavity 15 between both sections and completely surrounds the spring 7 within. The injection port 17 allows elastomer to flow into the cavity and completely surround the spring. The elastomer is heated to a temperature dependent upon the type of elastomer so that it readily flows into the cavity created between the male and female sections.

Once the elastomer has been injected, it is allowed to cool for a predetermined time. The objective of the cooling is to sufficiently solidify the elastomer around the spring 7.

Next, the male and female sections 11 and 13 are pulled apart exposing the newly formed spring seal 5 therebetween. It should be noted that the relevant depths of both the male and female sections are dependent upon the height of the spring seal to be formed. The relative depths of the male section compared to the female section is also dependent on the exterior curvature of the spring seal desired. To the extent that a C-shaped seal is desired having ends which narrow, the male and female sections must be shaped accordingly. Their relative depths must be so designed to allow the sections to be freely pulled apart after the elastomer has solidified within.

The sections 11 and 13 of the die should separate at an inflection point along the curved surface of the finished spring seal 5. Since the spring seal is flexible, the ends flex to allow the sections to separate from the spring seal.

For best results sharp curvatures should be avoided to best be able to pull apart the male and female sections ;1 and 13 once a spring seal 5 is formed. Ideally, the male section should be disengagable from the female section at a point of inflection of the exterior curvature of the part to be formed.

The male and female sections 11 and 13 are preferably made of metal or some other high temperature material and one which will not interreact with elastomer at an elevated temperature. The elastomer may be any number of materials and may include nylon, Teflon or polytetrafluoroethylene (PTFE).

In another embodiment of the invention a U-shaped spring seal (not shown) can be made the same way. However, the relative depths of the male and female sections 11 and 13 are not as critical when pulling apart the die sections 11 and !3 after a spring seal is formed.

In still another embodiment of the invention, a spring seal (not shown) having exposed surfaces, not coated with elastomer, can be produced. By varying the shape or width of the lip 14 of the male section 11, the lip can be made to come in contact with the spring 7. The spring's points of contact with the lip will not be coated by elastomer during the molding process. Alternatively, the spring may be shaped so as to come in contact with the lip of the male section at points along the spring to remain uncoated.

It should be appreciated from the foregoing description that the present invention provides an improved method of manufacturing spring seals. The method is simple in application, yet completely effective in providing a way to inexpensively mass produce large numbers of spring seals of uniform dimension and quality. Cutting tools are no longer required, nor is the two step cutting process necessary.

Although the present invention has been described in detail with reference only to the presently preferred emodiments, it will be appreciated by those of ordinary skill in the art that various modifications can be made without departing from the invention. Accordingly, the invention is limited only by the following claims.

What is claimed is:

1. A method of forming a finished spring seal using a spring and an elastomer comprising the steps of:
   (a) setting up a die, wherein said die comprises an independent male section and an independent female section;
   (b) loading the spring around a protruding lip portion of said male section;
   (c) positioning said female section so that a central portion thereof surrounds said protruding lip portion of said male section and at least part of the spring, and an outer peripheral portion of said female section abuts an outer peripheral portion of said male section;
   (d) injecting the elastomer at a temperature which allows it to flow into said sections allowing the elastomer to flow around the spring and allowing a predetermined time for the elastomer to set; and
   (e) obtaining the finished spring seal by separating said male and female sections and unloading the finished spring seal by flexing ends of the seal in said male section.

2. A method as claimed in claim 1, wherein said female section defines an injection port for injecting the elastomer.

3. A method as claimed in claim 2, wherein said male and female sections define within their combined interiors a U-shape or C-shape cavity which complements the spring and allows the elastomer to flow around the spring.

4. A method as claimed in claim 3, wherein during the step of injecting the elastomer, the elastomer is only allowed to partially surround the spring.

5. A method as claimed in claim 4, wherein said spring and said male section have shapes such as to prevent the elastomer from flowing around predetermined portions of the spring.

6. A method as claimed in claim 5, wherein said protruding lip portion has a shape complementing the spring and upon which the spring is loaded and wherein said male section further comprises recesses allowing the ends of the spring to sit therein when the spring has been loaded upon said lip portion.

7. A method as claimed in claim 6, wherein said male and said female sections are separable at an inflection point along the exterior curvature of the finished spring seal with said sections.

* * * * *